United States Patent Office 3,767,638
Patented Oct. 23, 1973

3,767,638
POLYOLEFINE COMPOSITION
Bernard Steven Woodward Johnson, St. Albans, England, assignor to Imperial Chemical Industries Limited, London, England
No Drawing. Filed Nov. 8, 1971, Ser. No. 196,758
Int. Cl. C08f 29/04, 45/00
U.S. Cl. 260—93.7    7 Claims

ABSTRACT OF THE DISCLOSURE

Polyolefines such as polyethylene and polypropylene contain as a prodegradant a compound containing a conjugated system of at least 3 double bonds. The preferred prodegradants are quinones, e.g. anthraquinone.

---

This invention relates to plastics compositions and in particular to polyolefine compositions.

The use of disposable plastics wrappings, containers and the like and their subsequent discarding, either intentionally or accidentally, has led to the problem of plastics litter. This invention relates to a plastics composition the use of which can alleviate the problem.

According to the present invention, there is provided a thermoplastics composition which contains as prodegradant from 0.001 up to 10.0% by weight of the composition of a compound hereinafter referred to as a "conjugated" compound, containing a conjugated double bond system of at least three double bonds which system extends through at least one 6 membered ring (wherein when there is more than one such ring, the rings may form a condensed ring system or may be otherwise linked), said conjugation being terminated by an oxygen atom attached to a ring carbon atom or by a divalent hydrocarbon radical.

The preferred prodegradants according to the invention are quinones and alkyl substituted quinones, e.g. benzoquinones, naphthaquinones and especially anthraquinones. The preferred concentrations for the prodegradant is 0.1% to 1% by weight, e.g. about 0.1% by weight.

The compositions according to the invention are preferably polyolefine compositions, e.g. compositions in which the thermoplastics polymer is a polymer of ethylene, propylene, butene-1, and 4-methyl pentene-1 and copolymers of these monomers either with each other or with other α-olefines. The ethylene polymers may be either the high density or the low density type.

In addition to the polymer and the prodegradant a composition according to the invention may also include other additives which are conventionally incorporated in thermoplastics polymer compositions, for example in the case of polyolefines they may incorporate anti-blocking agents, slip agents, anti-static agents, stabilisers to stabilise the composition during processing as well as stabilisers to stabilise the composition during use (i.e. after processing has finished).

The invention includes wrapping material, string and containers made of the plastics composition described above. The following are examples of containers; bags, sacks, boxes, cartons, bottles, sachets, cups and cartridge cases.

The invention also includes an item of merchandise packed in a material made of a plastics composition as described above.

Several compositions according to the invention will now be described by way of example. In these examples the following compounds are used as prodegradants; each has been given a code number for reference.

| Code | Name |
| --- | --- |
| Benzoquinones: | |
| P1 | 1,4-benzoquinone. |
| P2 | 2,5-dichloro-1,4-benzoquinone. |
| Single ring hydrocarbon: P3 | 1,4-diisopropenyl benzene. |
| Naphthaquinones: | |
| P4 | 1,4-naphthaquinone. |
| P5 | Sodium 1,2-naphthaquinone-4-sulphonate. |
| Anthraquinones: | |
| P6 | 9,10-anthraquinone. |
| P7 | 1,5-dihydroxy-9,10-anthraquinone. |
| P8 | 2-hydrazino-3-carboxy-9,10-anthraquinone. |
| P9 | 2-t.butyl-9,10-anthraquinone. |

| | Formula |
| --- | --- |
| Two rings, not condensed: | |
| P10 | O=C(CT=CH)(CT=CH)C=CH-CH=C(CH=CT)(CH=CT)C=O |
| P11 | O=C(CT=CH)(CT=CH)C=C(CH=CT)(CH=CT)C=O |

Note.—In P10 and P11 T represents a tertiary butyl group.

Blending technique

The prodegradant was formed into a solution or suspension in 5 cc. of ethanol or a mixture of ethanol and dichloromethane by grinding. This mixture was stirred with the polymer powder (polypropene, high density polyethylene or low density polyethylene) and the solvent was evaporated.

The polymer/prodegradant mixture was formed into film of thickness 100 microns by compression moulding using the following cycle:

Heat at 215° C. for 3 minutes under a pressure of 1 ton per sq. inch and at 20 tons for 6 minutes at 215° C. followed by cooling to 25° C. over 10 minutes. Samples 1 cm. x 3 cm. were cut from the film for testing.

Test methods

All the tests involved exposing the sample to radiation and observing the mechanical properties as an indication of degradation. The following tests were used and these will be identified by the name given.

Xenotest

The samples were subjected to UV irradiation in a Xenotest accelerated ageing machine. The samples were inspected daily and tested for flex-crack failure. The time to failure indicates the effect of the additive, a shorter time indicating a more effective additive.

FS/BL test

The samples were subjected to UV irradiation using a combination of equal numbers of fluorescent sunlamps and block lamps. The samples were maintained at a distance of 10 cm. from the lamps. Inspection and testing was carried out as in the Xenotest.

Outdoor test

The outdoor tests were carried out at Welwyn Garden City, Hertfordshire, England. The sample under test was mounted between "Perspex" (RTM) sheets with a circle 2 cm. in diameter uncovered and these were exposed at 45° to the horizontal facing south. The specimens were tested for embrittlement at weekly intervals by dropping a 3.8 g. mass in the form of a 7.5 mm. diameter rod onto the horizontal specimen. The mass was dropped from a height of 310 mm. down a vertical guide tube.

EXAMPLES 1–8

Prodegradants P1 to P8 were incorporated into polypropylene to give final concentrations of 0.06 moles kg. (about 1% by weight). These examples were tested by the Xenotest and the outdoor test and the results are given in Table 1.

TABLE 1

Prodegradants in polypropylene—predegradant concentration 0.06 moles/kg.

| Example number | Prodegradant code | Time to embrittlement (days) | |
|---|---|---|---|
| | | Xenotest | Outdoors |
| 1 | P1 | = | 44 |
| 2 | P2 | 3 | 44 |
| 3 | P3 | 2 | = |
| 4 | P4 | 2 | 48 |
| 5 | P5 | 3 | = |
| 6 | P6 | 1 | 42 |
| 7 | P7 | 3 | 42 |
| 8 | P8 | 1 | = |

The blanks, i.e. the polypropylene without any additives, gave embrittlement times of 5 days in the Xenotest and 88 days on outdoor exposure. Thus the prodegradants halved the life on outdoor exposure and gave substantial reductions in the Xenotest.

EXAMPLES 9 AND 10

Prodegradants P10 and P11 were also blended into polypropylene at concentration 0.06 moles/kg. These were tested by the outdoor test; the exposure began on Feb. 1, 1971. The results are given in Table 2.

TABLE 2

0.06 moles/kg. prodegradants in polypropylene

| Example number | Prodegradant code | Time to embrittle (days) |
|---|---|---|
| 9 | P10 | 11 |
| 10 | P11 | 31 |

The blank, i.e. polypropylene without prodegradant, was 94 days so prodegradants P9 and P10 gave substantial reductions.

EXAMPLES 11 AND 12

Prodegradants P10 and P11 were blended into high density polyethylene at concentration 0.1% by weight and the samples tested by the FS/BL test. The results are given in Table 3.

TABLE 3

0.1% wt. prodegradants in high density polyethylene

| Example number | Prodegradant code | Time to embrittle (days) |
|---|---|---|
| 11 | P10 | 19 |
| 12 | P11 | 21 |

The blank was 32 days so that the prodegradants cut the time to about two thirds.

EXAMPLE 13

High density polyethylene which contained 0.1% weight of prodegradant P6 and 0.02% of an in-process stabiliser was extruded into a tube 20 mm. diameter with walls 0.5 mm. thick. Dumb-bell shaped specimens were cut from the tube in the longitudinal direction and these were exposed to sunlight at Welwyn Garden City beginning on June 4, 1971. The samples were divided into 4 sets; the first set was kept behind glass for 8 days, the second was placed in the open for 8 days, the third behind glass for 12 days and the fourth in the open for 12 days. After each sample had been exposed it was strained at 2% (of its original length) per second at room temperature and the extension at break was noted. A sample which had not been exposed was also measured and the extensions of the irradiated samples were expressed as a percentage of the unirradiated sample; these results are given in Table 4 and thus demonstrate that P6 is an effective antioxidant.

TABLE 4

0.1% weight of P6 in high density polyethylene—decrease of extension to break on irradiation with sunlight

| Composition | In the open | | Behind glass | |
|---|---|---|---|---|
| | 8 days, percent | 12 days, percent | 8 days, percent | 12 days, percent |
| Example 13 | 50 | 24 | 48 | 10 |
| Blank | 60 | 45 | 64 | 46 |

Pressed film of high density polyethylene which contained 0.1% of P6 was tested in the FS/BL test. The example embrittled in 6 days, the blank in 10.

EXAMPLE 14

High density polyethylene film which contained 0.1% of P9 was tested in the FS/BL test. Example 14 embrittled in 11 days; the control took 20.

EXAMPLE 15

Prodegradant P6 was also tested at 0.1% weight concentration in low density polyethylene film which also contained conventional additives, i.e. an anti-blocking additive, slip agent, anti-static agent, a colour stabiliser and an additive which stabilised the polymer during the formation of the film. A blank test was also carried out on film without a prodegradant but with the conventional additives. In the FS/BL test Example 15 lasted 43 days, the control 59.

I claim:

1. A poly-α-monoolefin composition which contains 0.001 up to 10.0% by weight based on the polymer of an unsubstituted quinone or an alkyl substituted quinone which promotes the degradation of the poly-α-olefin under the influence of ultraviolet radiation.

2. A composition as set forth in claim 1 in which the quinone is 9,10-anthraquinone.

3. A composition as set forth in claim 1 in which the amount of said quinone or alkyl substituted quinone is 0.01% to 1% by weight.

4. A composition as set forth in claim 1 in which the poly-α-olefin is an ethylene or propylene polymer.

5. A wrapping material which is made of the composition of claim 1.

6. String made of the composition of claim 1.

7. A container made of the composition of claim 1.

References Cited

UNITED STATES PATENTS 3,538,068   11/1970   Morita et al. ___ 260—94.9 GD

OTHER REFERENCES

Chemical Abstracts 68, 79359j (1968), American Chemical Society, Wash., D.C.

JOSEPH L. SCHUFER, Primary Examiner

A. HOLLER, Assistant Examiner

U.S. Cl. X.R.

260—88.2 B, 94.9 GD, DIG. 43